US012767603B2

(12) United States Patent
Campbell et al.

(10) Patent No.: US 12,767,603 B2
(45) Date of Patent: Oct. 20, 2026

(54) PREFABRICATED NOODLE

(71) Applicant: Raytheon Technologies Corporation, Farmington, CT (US)

(72) Inventors: Christian X. Campbell, West Hartford, CT (US); Kathryn S. Read, Marlborough, CT (US); James T. Roach, Vernon, CT (US); Robert A. White, III, Meriden, CT (US); Daniel Josiah Whitney, East Waterboro, ME (US)

(73) Assignee: RTX Corporation, Farmington, CT (US)

( * ) Notice: Subject to any disclaimer, the term of this patent is extended or adjusted under 35 U.S.C. 154(b) by 618 days.

(21) Appl. No.: 18/196,594

(22) Filed: May 12, 2023

(65) Prior Publication Data

US 2024/0376017 A1 Nov. 14, 2024

(51) Int. Cl.
*C04B 35/80* (2006.01)
*B28B 23/00* (2006.01)
(Continued)

(52) U.S. Cl.
CPC .............. *C04B 35/80* (2013.01); *B28B 23/00* (2013.01); *C04B 35/62863* (2013.01); *C04B 35/62884* (2013.01); *C04B 35/62886* (2013.01); *C04B 35/64* (2013.01); *C04B 35/657* (2013.01); *C04B 2235/3826* (2013.01);
(Continued)

(58) Field of Classification Search
CPC .............. C04B 35/80; C04B 35/62863; C04B 35/62884; C04B 35/62886; C04B 35/64; C04B 35/657; C04B 2235/3826; C04B 2235/5256; C04B 2235/614; C04B 2235/616; C04B 35/565; C04B 35/571; C04B 2235/5244; C04B 2235/602; C04B 2235/6028; C04B 2235/612; B28B 23/00
See application file for complete search history.

(56) References Cited

U.S. PATENT DOCUMENTS

| | | | |
|---|---|---|---|
| 7,066,717 | B2 | 6/2006 | Morrison et al. |
| 10,906,842 | B2 | 2/2021 | Shi et al. |

(Continued)

FOREIGN PATENT DOCUMENTS

| | | | |
|---|---|---|---|
| EP | 4134357 | A1 | 2/2023 |

OTHER PUBLICATIONS

Dagani NPL (C&EN—pp. 7-16—May 11, 1987—Superconductivity: A revolution in electricity is taking shape) (Year: 1987).*

(Continued)

*Primary Examiner* — Xiao S Zhao
(74) *Attorney, Agent, or Firm* — Kinney & Lange, P.A.

(57) ABSTRACT

A method of forming a ceramic matrix composite includes fabricating a space filling insert by assembling the space filling insert from a fibrous ceramic material, placing the space filling insert into a tooling fixture, the tooling fixture having an internal shape complementary to a shape of the insert, and infiltrating the space filling insert with a first ceramic material. The method further includes forming a preform by laying up a plurality of fibrous ceramic plies and inserting the infiltrated space filling insert into a void defined by the plurality of plies. The method further includes infiltrating the preform with a second ceramic material.

20 Claims, 4 Drawing Sheets

(51) Int. Cl.
*C04B 35/628* (2006.01)
*C04B 35/64* (2006.01)
*C04B 35/657* (2006.01)

(52) U.S. Cl.
CPC ................. *C04B 2235/5256* (2013.01); *C04B 2235/614* (2013.01); *C04B 2235/616* (2013.01)

(56) References Cited

U.S. PATENT DOCUMENTS

| | | | | |
|---|---|---|---|---|
| 11,180,999 | B2 | 11/2021 | Decesare et al. | |
| 2001/0038817 | A1* | 11/2001 | Reiser | B22D 19/14 264/29.1 |
| 2004/0026828 | A1* | 2/2004 | Seimetz | H05B 3/145 264/319 |
| 2006/0141257 | A1* | 6/2006 | Subramanian | C04B 35/565 264/642 |
| 2008/0115421 | A1* | 5/2008 | Sani | C22C 1/1068 51/295 |
| 2009/0165924 | A1* | 7/2009 | Steibel | F01D 5/147 156/89.11 |
| 2009/0226279 | A1* | 9/2009 | Jarmon | F16B 21/02 264/249 |
| 2011/0139932 | A1* | 6/2011 | Matheson | B32B 7/05 156/182 |
| 2011/0150663 | A1* | 6/2011 | Manicke | C04B 35/63408 428/105 |
| 2013/0029175 | A1* | 1/2013 | Umemura | C04B 35/581 428/627 |
| 2013/0052030 | A1* | 2/2013 | McCaffrey | F01D 9/041 416/241 B |
| 2013/0295304 | A1* | 11/2013 | Moore | C04B 38/0675 428/34.4 |
| 2016/0185009 | A1* | 6/2016 | Keshavan | B28B 1/001 249/134 |
| 2017/0044920 | A1* | 2/2017 | Vetters | F01D 9/02 |
| 2017/0138208 | A1* | 5/2017 | Hillier | C04B 35/111 |
| 2018/0111882 | A1* | 4/2018 | Rateick, Jr. | B32B 18/00 |
| 2018/0230064 | A1* | 8/2018 | Lamusga | C04B 41/5096 |
| 2018/0311708 | A1* | 11/2018 | Barrett | C04B 35/565 |
| 2019/0185381 | A1* | 6/2019 | Ritchey | B33Y 50/02 |
| 2019/0210923 | A1* | 7/2019 | Sardou | C04B 35/488 |
| 2019/0225552 | A1* | 7/2019 | Taggart | B32B 18/00 |
| 2019/0359531 | A1 | 11/2019 | Steffier et al. | |
| 2020/0392049 | A1* | 12/2020 | Razzell | C04B 41/87 |
| 2021/0239008 | A1* | 8/2021 | Read | B33Y 80/00 |
| 2021/0331387 | A1* | 10/2021 | Duffy | B22F 7/06 |
| 2022/0356125 | A1* | 11/2022 | Fernandez | F01D 5/282 |
| 2023/0047461 | A1 | 2/2023 | Sudre | |
| 2023/0130393 | A1* | 4/2023 | Whittle | F01D 5/282 416/95 |

OTHER PUBLICATIONS

Extended European Search Report for EP Application No. 24174837.5, dated Nov. 4, 2024, 8 pages.

* cited by examiner

PREFABRICATED NOODLE

BACKGROUND

The present invention relates to ceramic matrix composites and, more particularly, space filling inserts for use in ceramic matrix composite preforms.

Many ceramic matrix composite (CMC) components for gas turbine engines have regions of variable wall thickness. Some of these regions are too small to form with textile-based plies, but too large to form using individual fiber tows. In such cases, space filling inserts can be used to build upon and prevent large voids in the body of the CMC. As with other locally thickened regions of CMCs, these inserts can often present challenges in achieving a high and/or uniform density through chemical vapor infiltration (CVI) or other infiltration processes.

SUMMARY

A method of forming a ceramic matrix composite includes fabricating a space filling insert by assembling the space filling insert from a fibrous ceramic material, placing the space filling insert into a tooling fixture, the tooling fixture having an internal shape complementary to a shape of the insert, and infiltrating the space filling insert with a first ceramic material. The method further includes forming a preform by laying up a plurality of fibrous ceramic plies and inserting the infiltrated space filling insert into a void defined by the plurality of plies. The method further includes infiltrating the preform with a second ceramic material.

A method of fabricating a space filling insert for a ceramic matrix composite includes assembling the space filling insert from a fibrous ceramic material, placing the space filling insert into a tooling fixture, the tooling fixture having an internal shape complementary to a shape of the insert, and infiltrating the space filling insert with a material.

Figure 1:
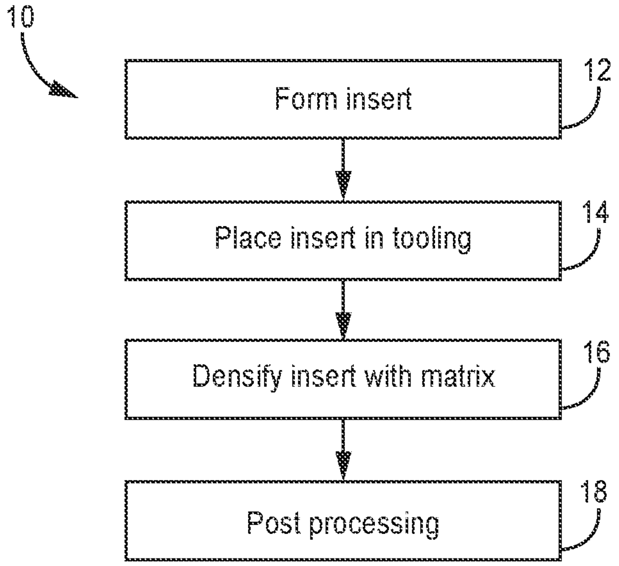
FIG. 1 is a flowchart illustrating select steps of a method for fabricating a space filling insert for a preform.

While the above-identified figures set forth one or more embodiments of the present disclosure, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features and components not specifically shown in the drawings.

DETAILED DESCRIPTION

This disclosure presents prefabricated space filling inserts, sometimes referred to as "noodles," for incorporation into a CMC preform. More specifically, space filling inserts can be at least partially densified with a matrix prior to incorporation into a preform. This allows for fabrication of CMC components with more uniformly deposited matrixes.

Figure 2:
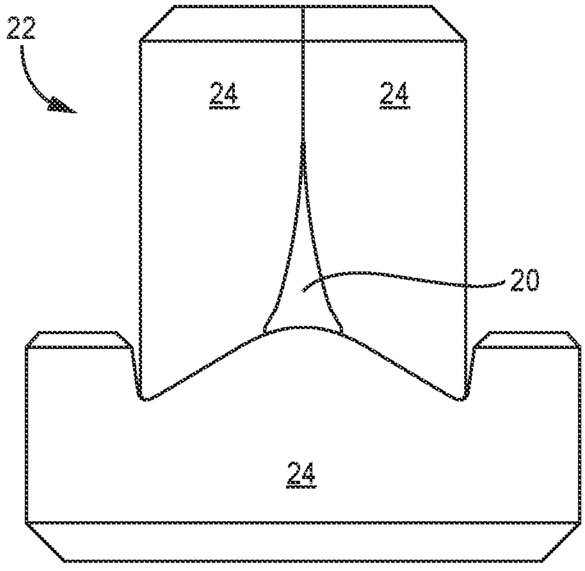
FIG. 2 is a front view of a space filling insert mounted within a tooling fixture.
Figure 3:
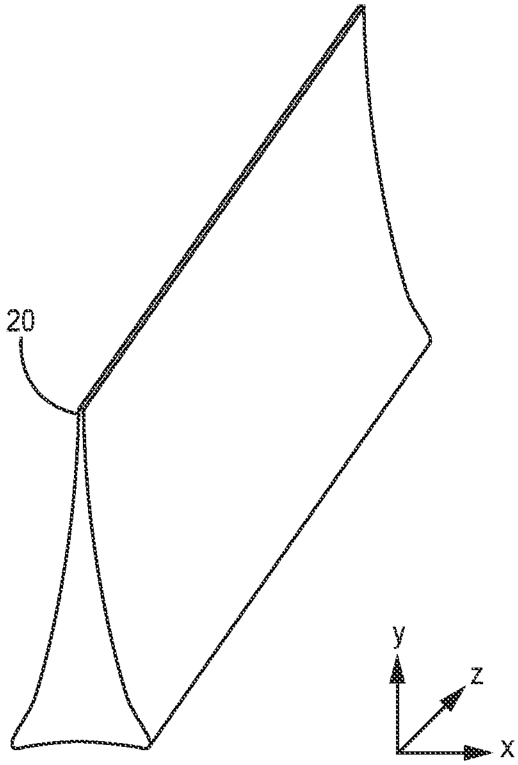
FIG. 3 is a perspective view of the space filling insert.

FIG. 1 is a method flowchart illustrating steps 12-18 of method 10 for fabricating an insert. FIG. 2 is front view of insert 20 mounted within tooling fixture 22. FIG. 3 is a perspective view of insert 20 shown without tooling fixture 22. FIGS. 1-3 are discussed together.

At step 12, insert 20 can be assembled from a fibrous ceramic material. Exemplary materials include two or three-dimensional woven, braided, knitted or non-textile (e.g., unidirectional short/long strand matted, etc.) ceramic (e.g., silicon carbide—SiC) structures. A polymer binder (e.g., polyvinyl alcohol or polyvinyl butyral) can optionally be applied to the ceramic material to rigidize insert 20.

At step 14, insert 20, with or without a binder, can be placed into tooling fixture 22 which can include one or more segments 24. Each segment 24 can be machined such that, when assembled, tooling fixture 22 mirrors the dimensions of the specific preform cavity receiving insert 20. As such, tooling fixture 22 can help mold insert 20 into a more precise shape. Tooling fixture 22 further supports insert 20 during densification, as is discussed in greater detail below. Segments 24 can, accordingly, be formed from graphite, refractory metals, or a carbon-carbon composite, to name a few, non-limiting examples. One or more segments 24 can include infiltration holes (not visible in the plane of FIG. 2) to allow insert 20 to be infiltrated with reactant vapors during interface coating deposition and/or densification. The manner of assembly of insert 20 and fabrication and selection of tooling fixture 22 can be based upon a prior determination of the expected geometry of a preform void to create a suitable insert 20.

At step 16, insert 20, mounted within tooling fixture 22, can be infiltrated with a ceramic (e.g., SiC) matrix. In one embodiment, matrix formation can be carried out using CVI. During matrix formation, insert 20 is infiltrated by reactant vapors, and a gaseous precursor deposits on the ceramic fibers. Infiltration is carried out until reaching a desired porosity. In one embodiment, insert 20 can be partially infiltrated, such that an amount of open porosity (i.e., above the desired final porosity) is present at the conclusion of step 16. This may be preferable to allow further infiltration of insert 20 once incorporated into a preform, which can improve bonding between insert 20 and the surrounding structure of the preform. A fully infiltrated insert 20 after step 16 can be preferable where very low insert porosity is desired, such as in CMC regions requiring high thermal conductivity and/or high oxidation resistance. Alternative methodologies for matrix formation can include, but are not limited to, one or a combination of melt infiltration (MI) or polymer infiltration and pyrolysis (PIP). In some embodiments, one or several interface coatings of a ceramic material (e.g., of boron nitride—BN) can be deposited prior to formation of the ceramic matrix. In some other embodiments, interface coatings can deposited at step 16, and densification can take place after the coated insert 20 is incorporated into a preform.

At step 18, insert 20 can optionally undergo post-infiltration processing. As shown in FIG. 3, insert 20 has a three-dimensional geometry defined by a length along the z-axis, a height along the y-axis, and a width along the x-axis which varies along the height. Insert 20 has a somewhat triangular cross-sectional geometry with a slight concavity to each side in the x-y plane, but other geometries (e.g., four-sided, elliptical, combinations of straight and/or curved sides, etc.) are contemplated herein and would be selected to complement the shape of the preform void being occupied. One post-processing example can include removing insert 20 from tooling fixture 22 and trimming insert to a desired length. Tooling fixture 22 can be designed to accommodate a longer "blank" insert which can trimmed to a desired length and shape. In some examples, tooling fixture 22 can be sized to accommodate an oversized "blank" that can be trimmed into multiple inserts 20, economically providing a prefabricated insert inventory for a plurality of preform variants.

Figure 4:
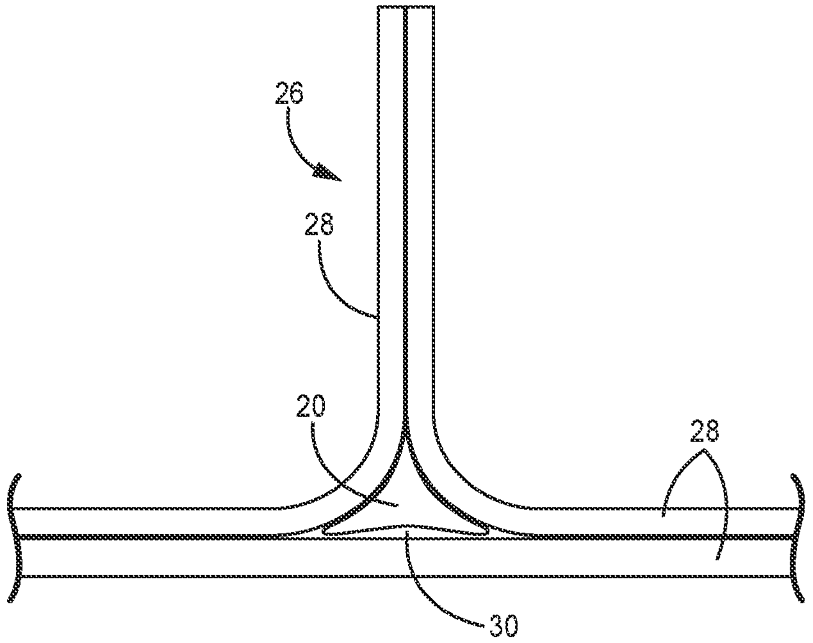
FIG. 4 is a simplified cross-sectional view of a preform incorporating a space-filing insert.

FIG. 4 is a simplified cross-sectional illustration of a portion of preform 26 incorporating insert 20. Preform 26 is formed from various fibrous ceramic (e.g., SiC) plies 28, three of which are arranged in such manner as to form a pseudo-triangle or deltoid defining void 30 requiring reinforcement from insert 20. Plies 28 can be formed from braided, woven, and/or chopped ceramic fibers or tows. Voids 30 are common, for example, where plies 28 are folded and joined to form airfoils, platforms, flanges, etc., in CMC blades, vanes, rings, seals, etc. Additional plies 28 and/or other ceramic structures can also be included. Preform 26 incorporating one or more variously or uniformly shaped inserts 20 can be mounted within a tooling fixture (not shown) and undergo infiltration with an interface coating and/or ceramic matrix in a manner substantially similar to what is described with respect to step 16 above. Whereas traditional inserts can be insufficiently infiltrated with matrix compared to the remainder of the preform due to their individual thicknesses and more internal preform locations, prefabricated inserts 20 are already at least partially densified/rigidized prior to full preform densification. Thus, they can be infiltrated to the desired degree regardless of geometry and/or preform construction.

A CMC component formed with the disclosed prefabricated inserts can be incorporated into components for multiple industries such as aerospace, maritime, or industrial, to name a few, non-limiting examples.

DISCUSSION OF POSSIBLE EMBODIMENTS

The following are non-exclusive descriptions of possible embodiments of the present invention.

A method of forming a ceramic matrix composite includes fabricating a space filling insert by assembling the space filling insert from a fibrous ceramic material, placing the space filling insert into a tooling fixture, the tooling fixture having an internal shape complementary to a shape of the insert, and infiltrating the space filling insert with a first ceramic material. The method further includes forming a preform by laying up a plurality of fibrous ceramic plies and inserting the infiltrated space filling insert into a void defined by the plurality of plies. The method further includes infiltrating the preform with a second ceramic material.

The method of the preceding paragraph can optionally include, additionally and/or alternatively, any one or more of the following features, configurations and/or additional steps:

In the above method, at least one of the first ceramic material and the second ceramic material can be a ceramic matrix.

In any of the above methods, the ceramic matrix comprises silicon carbide.

In any of the above methods, at least one of the first ceramic material and the second ceramic material can be a ceramic interface coating.

In any of the above methods, the steps of infiltrating each of the space filling insert and the preform can include one of: chemical vapor infiltration, polymer infiltration and pyrolysis, and melt infiltration.

Any of the above methods can further include prior to placing the space filling insert into the tooling fixture, applying a polymer binder to the space filling insert.

In any of the above methods, the tooling fixture can include a plurality of segments.

In any of the above methods, at least one of the plurality of segments can include infiltration holes.

In any of the above methods, the tooling fixture can be formed from one of graphite, a carbon-carbon composite, and a refractory metal.

Any of the above methods can further include prior to fabricating the space filling insert, ascertaining an expected geometry of the void, and assembling the tooling fixture such that the internal shape substantially matches the expected shape of the void.

A method of fabricating a space filling insert for a ceramic matrix composite includes assembling the space filling insert from a fibrous ceramic material, placing the space filling insert into a tooling fixture, the tooling fixture having an internal shape complementary to a shape of the insert, and infiltrating the space filling insert with a material.

The method of the preceding paragraph can optionally include, additionally and/or alternatively, any one or more of the following features, configurations and/or additional steps:

In the above method, the fibrous ceramic material can include silicon carbide.

In any of the above methods, the material can form one of a ceramic interface coating and a ceramic matrix.

In any of the above methods, the ceramic matrix can include silicon carbide.

Any of the above methods can further include prior to placing the space filling insert into the tooling fixture, applying a polymer binder to the space filling insert.

Any of the above methods can further include after infiltrating the space filling insert, removing the space filling insert from the tooling fixture, and trimming the space filling insert.

In any of the above methods, the tooling fixture can include a plurality of segments.

In any of the above methods, at least one of the plurality of segments can include infiltration holes.

In any of the above methods, the tooling fixture can be formed from one of graphite, a carbon-carbon composite, and a refractory metal.

In any of the above methods, the step of infiltrating the space filling insert comprises one of: chemical vapor infiltration, polymer infiltration and pyrolysis, and melt infiltration.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention should not be limited to the particular embodiment(s) disclosed, but that the invention will include all embodiments falling within the scope of the appended claims.

The invention claimed is:

1. A method of forming a ceramic matrix composite, the method comprising:

fabricating a space filling insert by:

assembling the space filling insert from a fibrous ceramic material;

placing the space filling insert into a tooling fixture, the tooling fixture having an internal shape complementary to a shape of the insert; and infiltrating, via chemical vapor infiltration, the space filling insert in the tooling fixture with a ceramic matrix;

forming a preform by:

laying up a plurality of fibrous ceramic plies; and inserting the infiltrated space filling insert into a void defined by the plurality of plies; and infiltrating the preform with a ceramic matrix.

2. The method of claim 1, wherein the ceramic matrix comprises silicon carbide.

3. The method of claim 1 and further comprising infiltrating each of the space filling insert and the preform with a ceramic interface coating.

4. The method of claim 1, wherein the of infiltrating the preform comprises one of: chemical vapor infiltration, polymer infiltration and pyrolysis, and melt infiltration.

5. The method of claim 1 and further comprising: prior to placing the space filling insert into the tooling fixture, applying a polymer binder to the space filling insert.

6. The method of claim 1, wherein the tooling fixture comprises a plurality of segments.

7. The method of claim 6, wherein at least one of the plurality of segments comprises infiltration holes.

8. The method of claim 1, wherein the tooling fixture is formed from one of graphite, a carbon-carbon composite, and a refractory metal.

9. The method of claim 1 and further comprising:

prior to fabricating the space filling insert:

ascertaining an expected geometry of the void; and assembling the tooling fixture such that the internal shape substantially matches the expected shape of the void.

10. The method of claim 1, wherein the space filling insert is partially infiltrated, such that an amount of open porosity remains.

11. A method of forming a ceramic matrix composite, the method comprising:

fabricating a space filling insert by:

assembling the space filling insert from a fibrous ceramic material;

placing the space filling insert into a tooling fixture, the tooling fixture having an internal shape complementary to a shape of the insert;

infiltrating the space filling insert in the tooling fixture with a ceramic matrix; and removing the infiltrated space filling insert from the tooling fixture and trimming the infiltrated space filling insert;

forming a preform by:

laying up a plurality of fibrous ceramic plies; and inserting the infiltrated space filling insert into a void defined by the plurality of plies, wherein the infiltrated space filling insert is trimmed to a length of the void; and infiltrating the preform with a ceramic matrix.

12. The method of claim 11, wherein the ceramic matrix comprises silicon carbide.

13. The method of claim 11 and further requiring infiltrating each of the space filling insert and the preform with a ceramic interface coating.

14. The method of claim 11, wherein the step of infiltrating the space filling insert comprises chemical vapor infiltration and wherein the step of infiltrating the preform comprises one of: chemical vapor infiltration, polymer infiltration and pyrolysis, and melt infiltration.

15. The method of claim 11 and further comprising: prior to placing the space filling insert into the tooling fixture, applying a polymer binder to the space filling insert.

16. The method of claim 11, wherein the tooling fixture comprises a plurality of segments.

17. The method of claim 16, wherein at least one of the plurality of segments comprises infiltration holes.

18. The method of claim 11, wherein the tooling fixture is formed from one of graphite, a carbon-carbon composite, and a refractory metal.

19. The method of claim 11 and further comprising:

prior to fabricating the space filling insert:

ascertaining an expected geometry of the void; and assembling the tooling fixture such that the internal shape substantially matches the expected shape of the void.

20. The method of claim 11, wherein the space filling insert is partially infiltrated, such that an amount of open porosity remains.

* * * * *